United States Patent
Takahashi et al.

(10) Patent No.: US 8,324,595 B2
(45) Date of Patent: Dec. 4, 2012

(54) OUTDOOR WATER TREATMENT APPARATUS TO KILL BACTERIA WITH ULTRAVIOLET LIGHT

(75) Inventors: Akira Takahashi, Tokushima (JP);
Yohsuke Kinouchi, Tokushima (JP);
Masatake Akutagawa, Tokushima (JP)

(73) Assignee: The University of Tokushima, Tokushima-Shi (JP)

( * ) Notice: Subject to any disclaimer, the term of this patent is extended or adjusted under 35 U.S.C. 154(b) by 61 days.

(21) Appl. No.: 13/130,574

(22) PCT Filed: Nov. 21, 2009

(86) PCT No.: PCT/JP2009/006295
§ 371 (c)(1),
(2), (4) Date: May 20, 2011

(87) PCT Pub. No.: WO2010/058607
PCT Pub. Date: May 27, 2010

(65) Prior Publication Data
US 2011/0226966 A1   Sep. 22, 2011

(30) Foreign Application Priority Data
Nov. 21, 2008  (JP) .................. 2008-298593

(51) Int. Cl.
*C02F 1/32* (2006.01)
*C02F 1/72* (2006.01)

(52) U.S. Cl. .............. 250/455.11; 210/748.11; 250/435; 250/432 R; 250/504 R; 257/46; 257/98; 422/24; 435/2

(58) Field of Classification Search ............... 210/748.1; 250/435, 432 R, 455.11, 504 R; 257/76, 257/98; 422/24; 435/2
See application file for complete search history.

(56) References Cited

U.S. PATENT DOCUMENTS

| | | | | |
|---|---|---|---|---|
| 6,010,727 A | * | 1/2000 | Rosenthal | 426/240 |
| 6,150,663 A | * | 11/2000 | Rosenthal | 250/435 |
| 6,254,625 B1 | * | 7/2001 | Rosenthal et al. | 607/88 |
| 6,403,030 B1 | * | 6/2002 | Horton, III | 210/748.11 |
| 6,447,720 B1 | * | 9/2002 | Horton et al. | 210/748.11 |
| 6,569,386 B1 | * | 5/2003 | Ko et al. | 422/120 |
| 7,118,852 B2 | * | 10/2006 | Purdum | 435/2 |

(Continued)

FOREIGN PATENT DOCUMENTS

JP   2003-154379   5/2003

(Continued)

OTHER PUBLICATIONS

Translation of International Preliminary Report on Patentability (Chapter II) for corresponding International Application No. PCT/JP2009/006295, Jun. 16, 2011.

(Continued)

*Primary Examiner* — David A Vanore
(74) *Attorney, Agent, or Firm* — Ditthavong Mori & Steiner, P.C.

(57) ABSTRACT

Bacteria in water 9 exposed outdoors are effectively killed with ultraviolet (UV) light by suppressing post-treatment increase in the bacteria population due to photoreactivation. The apparatus shines UV light on the water 9 to kill bacteria and has UV light emitting diodes (LEDs) 1 that emit UVA light with a primary emission peak of 320 nm-400 nm. The antibacterial action of the UVA light emitted by the UV LEDs 1 prevents proliferation of bacteria in the disinfected water 9 due to photoreactivation.

21 Claims, 10 Drawing Sheets

U.S. PATENT DOCUMENTS

| | | | |
|---|---|---|---|
| 7,396,491 B2 * | 7/2008 | Marking et al. | 252/301.4 P |
| 7,695,675 B2 * | 4/2010 | Kaiser et al. | 422/24 |
| 8,067,778 B2 * | 11/2011 | Bae et al. | 257/98 |
| 8,153,058 B2 * | 4/2012 | Araiza et al. | 422/24 |
| 8,186,004 B2 * | 5/2012 | Garcia et al. | 15/339 |
| 8,203,124 B2 * | 6/2012 | Havens et al. | 250/455.11 |
| 2003/0194692 A1 * | 10/2003 | Purdum | 435/2 |
| 2007/0267356 A1 | 11/2007 | Wong | |
| 2008/0206095 A1 * | 8/2008 | Duthie | 422/24 |
| 2008/0265179 A1 * | 10/2008 | Havens et al. | 250/492.1 |
| 2009/0230038 A1 | 9/2009 | Tanaka et al. | |
| 2011/0226966 A1 * | 9/2011 | Takahashi et al. | 250/492.1 |
| 2011/0243789 A1 * | 10/2011 | Roberts | 422/24 |
| 2012/0006995 A1 * | 1/2012 | Greuel | 250/373 |
| 2012/0032223 A1 * | 2/2012 | Bae et al. | 257/98 |
| 2012/0146047 A1 * | 6/2012 | Kneissl et al. | 257/76 |

FOREIGN PATENT DOCUMENTS

| | | |
|---|---|---|
| JP | 2004-57845 | 2/2004 |
| JP | 2007-69204 | 3/2007 |
| JP | 2007-152304 | 6/2007 |
| JP | 2007-307544 | 11/2007 |
| JP | 2008-136940 | 6/2008 |
| WO | WO 2007/043592 | 4/2007 |

OTHER PUBLICATIONS

International Search Report for International Application No. PCT/JP2009/006295, Jan. 19, 2010.

* cited by examiner

OUTDOOR WATER TREATMENT APPARATUS TO KILL BACTERIA WITH ULTRAVIOLET LIGHT

BACKGROUND OF THE INVENTION

1. Field of the Invention

The present invention relates to an outdoor water treatment apparatus to kill bacteria with ultraviolet light used primarily to treat water such as (bacterially) polluted water, swimming pool water, and fish farm (aquaculture) water that is outdoors and exposed to sunlight.

2. Description of the Related Art

Eradicating bacteria is essential in industry as well as in everyday life. In general, there are well known methods of killing bacteria (disinfection and sterilization treatments) such as chemical treatment, heat treatment, ultraviolet light treatment, and ozone treatment. However, with increasing awareness of the environment and chemical pollution, demand has developed for high quality treatment technology from perspectives that include not altering the treated substance, not leaving unwanted residues, and not detrimentally impacting the environment. In this context, treatment methods that kill bacteria with ultraviolet (UV) light are becoming widely adopted.

In contrast with chemical treatment methods, killing bacteria with UV light leaves no residues and is superior from the standpoint of safety. Further, since UV treatment damages bacterial deoxyribonucleic acid (DNA), it has the positive feature that chemical-resistant (antibiotic-resistant) bacteria are not produced as is possible in chemical treatments. The antibacterial mechanism associated with UV light exposure is commonly explained as follows. The cells of all living organisms as well as bacteria contain nucleic acid (including DNA) that administers cell genetic information. When irradiated with UV, nucleic acid absorbs the UV light and adjacent pyrimidine bases (primarily thymine) bond covalently to form a pyrimidine dimmer (a molecular lesion). This inhibits genetic transcription and metabolic disorder results leading to death of the cell.

An apparatus to disinfect water using ultraviolet light has been developed (refer to Japanese Laid-Open Patent Publication 2008-136940). The apparatus cited in this disclosure kills bacteria via a UV light source disposed outside a tube through which treatment water flows. The UV light source includes UV lamps (black lights) or light emitting diodes (LEDs) that shine UV light on the treatment water to kill bacteria. This apparatus can disinfect water without the use of chemicals. However, although UV disinfection damages cell DNA to render microbes inactive, subsequent irradiation with sunlight, which includes near ultraviolet (with wavelengths~380 nm-200 nm) and visible (with wavelengths~780 nm-380 nm) components, can cause inactive microbes to recover and multiply. Specifically, photoreactivation (also called photorecovery) can occur and reduce the effectiveness of UV disinfection. Photoreactivation is a result of activation, by light with a wavelength close to 400 nm, of genetic repair enzymes (photolyases) that repair pyrimidine dimmer lesions. Specifically, UV disinfection is due to chromosomal damage that results from direct microbial DNA impairment by pyrimidine dimmer lesion formation. However, when light with a wavelength close to 400 nm is shined on microbes rendered inactive by UV, genetic repair enzymes (photolyases) are activated that repair the pyrimidine dimmer lesions, and microbial reactivation occurs due to photoreactivation.

FIG. 1 is a graph showing microbial recovery due to photoreactivation after disinfection by ultraviolet light irradiation. In this graph, the horizontal axis is time in minutes, and the vertical axis shows the reduced number of *Escherichia coli* (*E. coli*) bacteria due to disinfection normalized to a value of one for the number of bacteria prior to disinfection. This graph shows the increase in the number of bacteria when the population is reduced to $1/2500^{th}$ by approximately 30 min irradiation with UVC light having a primary emission peak at 254 nm and an intensity (power per area) of 0.01 mW/cm$^2$, and subsequently is exposed to UVA light having a primary emission peak at 365 nm and an intensity of 0.30 mW/cm$^2$. (Here, standard UV spectral range notation is adopted: UVA [315 nm-400 nm]; UVB [280 nm-315 nm]; and UVC [100 nm-280 nm].) From this graph it is clear that when *E. coli* bacteria are exposed to the UVA light included in sunlight after exposure to UVC light, the bacteria count, which was initially reduced to $1/2500^{th}$ by disinfection, increases to $1/20^{th}$ after approximately 180 minutes. The broken line in this graph shows the bacteria count reduced to $1/2500^{th}$ by disinfection with no subsequent light exposure and no increase in the bacteria count. From this graph, it is apparent that disinfected *E. coli* bacteria increase by a factor greater than 100 due to photoreactivation.

SUMMARY OF THE INVENTION

The present invention was developed to resolve the drawbacks described above. Thus, it is a primary object of the present invention to provide an outdoor water treatment apparatus to kill bacteria with ultraviolet light that can effectively kill bacteria with ultraviolet light and suppress bacteria increase due to photoreactivation after disinfection.

The apparatus to kill bacteria with ultraviolet light of the present invention kills bacteria by irradiating water 9 that is outdoors with UV light. The apparatus is provided with UV LEDs 1 that shine UVA ultraviolet light with a primary emission peak of 320 nm to 400 nm. The UV LEDs 1 irradiate water 9 with UVA ultraviolet light to kill bacteria and prevent recovery due to photoreactivation of the treated bacteria.

The apparatus to kill bacteria with ultraviolet light has the characteristic that it can prevent post-disinfection bacterial increase due to photoreactivation, and can effectively kill bacteria with UV light in water that is outdoors exposed to sunlight. FIG. 2 shows that by suppressing photoreactivation, the apparatus of the present invention can effectively maintain a disinfected state even when exposed to sunlight. In this figure, the number of *E. coli* bacteria is initially reduced to approximately $1/800^{th}$ by 30 min of UVA ultraviolet light irradiation (via UV LEDs) having a primary emission peak at 365 nm and an intensity of 70 mW/cm$^2$. Subsequently, bacteria are further exposed to UVA light with a primary emission peak at 365 nm, which is a component of sunlight. The curves A, B, and C in the figure show the change in bacteria count due to irradiation with UV light having an intensity of 0.01 mW/cm$^2$, 0.09 mW/cm$^2$, and 0.30 mW/cm$^2$ respectively after initial disinfection to $1/800^{th}$. The broken line in this graph shows the bacteria count after reduction to $1/800^{th}$ by disinfection and no subsequent light exposure.

From this graph it is clear that after killing *E. coli* bacteria to reduce the population to $1/800^{th}$ by irradiation with UVA ultraviolet light, *E. coli* bacteria do not multiply due to photoreactivation even when exposed to the UVA light included in sunlight. In fact, further exposure to UVA ultraviolet light can further reduce the number of bacteria.

FIG. 3 is a graph showing disinfection of *Vibrio parahaemolyticus* (*V. parahaemolyticus*) bacteria. This figure shows initial disinfection of *V. parahaemolyticus* bacteria to approximately $1/700^{th}$ by irradiation with UVC ultraviolet light having a primary emission peak at 254 nm followed by exposure to UVA light included in sunlight with a primary emission peak at 405 nm. The figure also shows initial disinfection of *V. parahaemolyticus* bacteria to approximately $1/700^{th}$ by irradiation with UVA ultraviolet light having a primary emission peak at 365 nm followed by exposure to UVA light included in sunlight with a primary emission peak at 405 nm. Curve A shows the number of *V. parahaemolyticus* bacteria for initial disinfection with UVC light, and curve B shows the number of *V. parahaemolyticus* bacteria for initial disinfection with UVA light. Broken line curve C shows bacteria count reduction to $1/700^{th}$ by UVC with no subsequent light exposure, and broken line D shows bacteria count reduction to $1/700^{th}$ by UVA with no subsequent light exposure. From curve A of this figure it is clear that *V. parahaemolyticus* bacteria initially treated with UVC light increase due to photoreactivation to $1/50^{th}$ after 180 min. Specifically, increase in the number of bacteria due to photoreactivation is greater than a factor ten. In contrast, photoreactivation does not occur for *V. parahaemolyticus* bacteria initially treated with UVA light, and there is essentially no increase in the number of bacteria after 180 min with or without subsequent light exposure.

The apparatus to kill bacteria described above also has the following accompanying positive feature. Since the apparatus uses LEDs that emit UVA ultraviolet light with wavelengths close to visible light, it can effectively kill bacteria while preventing damage to the human eye. Prior art apparatus to kill bacteria with ultraviolet light use UV light that is not visible and require stopping irradiation when people are present. The apparatus to kill bacteria with ultraviolet light of the present invention allows visual confirmation of operation, and does not require shut-down when people are present. This allows twenty-four hour continuous irradiation to effectively kill bacteria. Further, the apparatus can be installed in plainly visible locations such as on a wall without providing special shielding materials.

The water 9 that is outdoors and is treated by the outdoor water treatment apparatus to kill bacteria with ultraviolet light of the present invention can be either (bacterially) polluted water, outdoor swimming pool water, or fish farm (aquaculture) pond water.

The apparatus to kill bacteria with ultraviolet light described above has the characteristic that bacteria can be effectively killed in polluted water, outdoor swimming pool water, or fish farm pond water even when that water is channeled outdoors and exposed to sunlight. In particular for bacterially polluted water, the apparatus to kill bacteria with ultraviolet light has the outstanding characteristic that treated water discharged into a river or ocean does not have negative effects on the environment such as with chemical treatments. Further, since bacteria in an outdoor swimming pool can be effectively killed without chemicals such as chlorine, the apparatus has the characteristic that there are absolutely no detrimental effects due to chemicals on the swimmers, and the pool can be safely used with confidence. In addition, to prevent the loss of fish in fish farming, large quantities of antibiotics are added to the fish food. This leaves residual antibiotics in the farmed fish, and is without doubt undesirable as a human food source. Since the apparatus of the present invention can effectively kill bacteria in fish farm pond water, the death of fish due to bacteria can be effectively prevented. Consequently, the quantity of antibiotics added to the fish food can be reduced to minimize residual antibiotics in the farmed fish. This allows production of farmed fish that can be safely consumed with confidence.

The UV LEDs 1 of the outdoor water treatment apparatus to kill bacteria with ultraviolet light of the present invention can have a primary emission peak that is 350 nm to 380 nm.

In addition, the outdoor water treatment apparatus to kill bacteria with ultraviolet light of the present invention can have UVC light sources 2 that shine UVC ultraviolet light in addition to the UV LEDs 1.

FIGS. 4-6 are graphs showing the change in bacteria population due to photoreactivation after UV disinfection of polluted water. In these figures, the solid lines show the change in the number of bacteria as a result of exposure to a UVA component of sunlight with a wavelength of 365 nm and intensity of 0.30 mW/cm$^2$ after initial UV disinfection. The broken lines show the change in the number of bacteria after initial UV disinfection with no subsequent light exposure.

The solid line in FIG. 4 shows the change in the number of bacteria after initial disinfection with UVC ultraviolet light having a primary emission peak at 254 nm and intensity of 0.02 mW/cm$^2$. From this graph it is clear that bacteria treated with UVC ultraviolet light rapidly increase in number after UVC exposure is stopped and the population is exposed to sunlight. Specifically, the bacteria population increases markedly due to photoreactivation.

In contrast, FIG. 5 shows initial disinfection with UVA ultraviolet light having a primary emission peak at 365 nm and intensity of 70 mW/cm$^2$, and subsequent exposure to the UVA component of sunlight. In this case, the bacteria population does not increase due to photoreactivation. Further, FIG. 6 shows the change in the number of bacteria in polluted water after initial disinfection by simultaneous irradiation with both UVC light having a primary emission peak at 254 nm and intensity of 0.02 mW/cm$^2$ and UVA light having a primary emission peak at 365 nm and intensity of 70 mW/cm$^2$. This figure shows that initial disinfection by irradiation with both UVC and UVA light can very effectively reduce the bacteria population to approximately $1/5000^{th}$, and regardless of this large reduction, there is essentially no bacteria population increase due to photoreactivation. Specifically, even though UVC and UVA ultraviolet light can act effectively in combination to kill bacteria, photoreactivation can be suppressed in an ideal manner by the UVA treatment. Consequently, the apparatus can effectively kill bacteria using low cost UV light sources such as UV lamps or disinfecting lamps while simultaneous UVA irradiation can suppress bacteria population increase due to photoreactivation in an ideal manner.

Further, in the outdoor water treatment apparatus to kill bacteria with ultraviolet light of the present invention, UVC light source 2 output can be lower than UV LED 1 output.

By making the UVC light source output lower than UV LED output in the apparatus described above, the UVC light sources and UV LEDs can act synergistically to effectively kill bacteria. Consequently, the apparatus has the characteristic that bacteria can be effectively killed with reduced equipment cost while suppressing bacteria propagation in the disinfected population due to photoreactivation. This allows the disinfected condition to be effectively maintained. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures. It should be appreciated, however, that the embodiments described below are illustrations of an apparatus to kill bacteria with ultraviolet light to give a concrete form to technical ideas of the invention, and the apparatus to kill bacteria with ultraviolet light of the invention are not specifically limited to description below. Furthermore, it should be appreciated that the members shown in claims attached hereto are not specifically limited to members in the embodiments.

Figure 7:
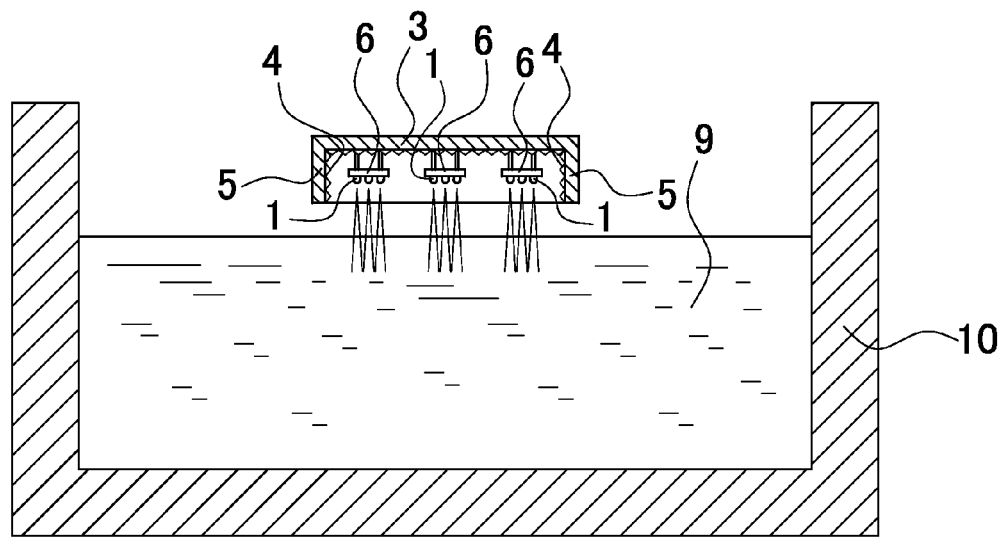
FIG. 7 is a schematic cross-section showing operation of an apparatus to kill bacteria with ultraviolet light.
Figure 8:
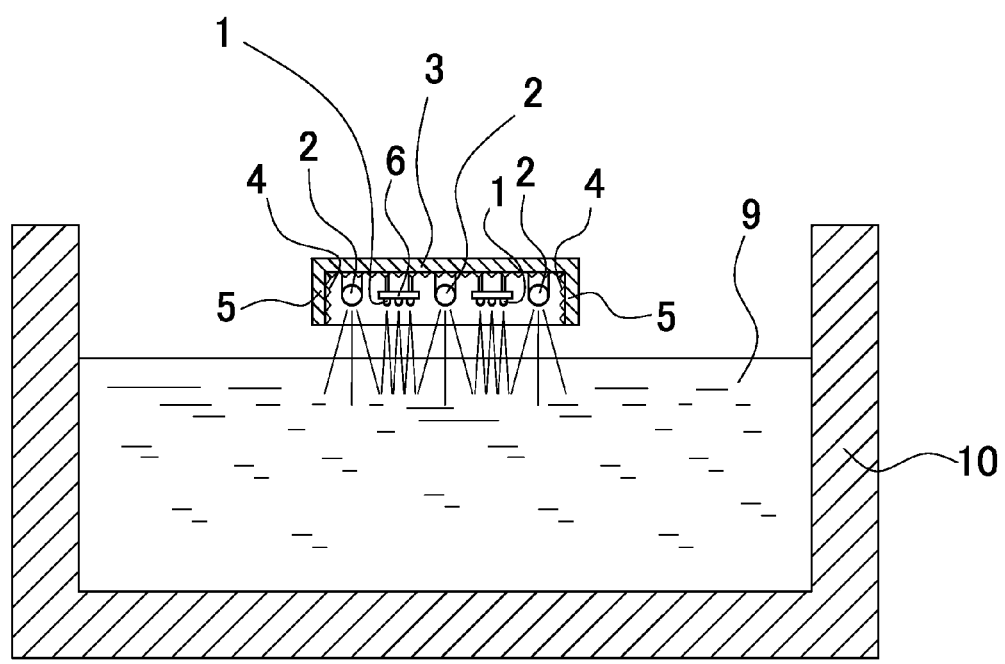
FIG. 8 is a schematic cross-section showing operation of an apparatus to kill bacteria with ultraviolet light for an embodiment of the present invention.
Figure 9:
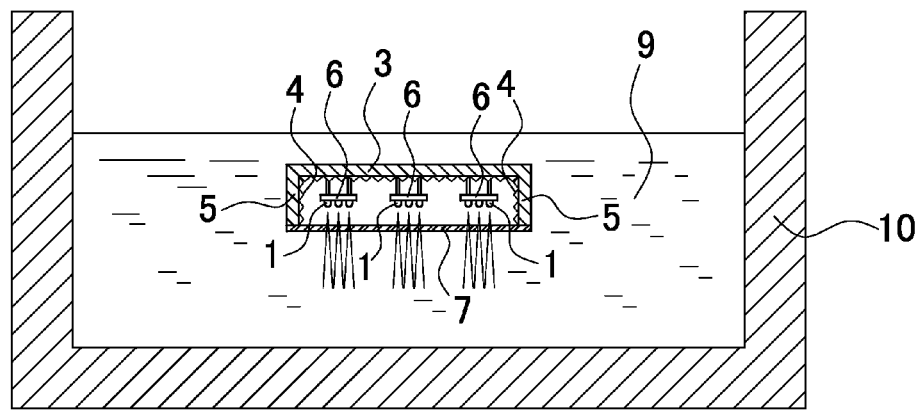
FIG. 9 is a schematic cross-section showing operation of an apparatus to kill bacteria with ultraviolet light.
Figure 10:
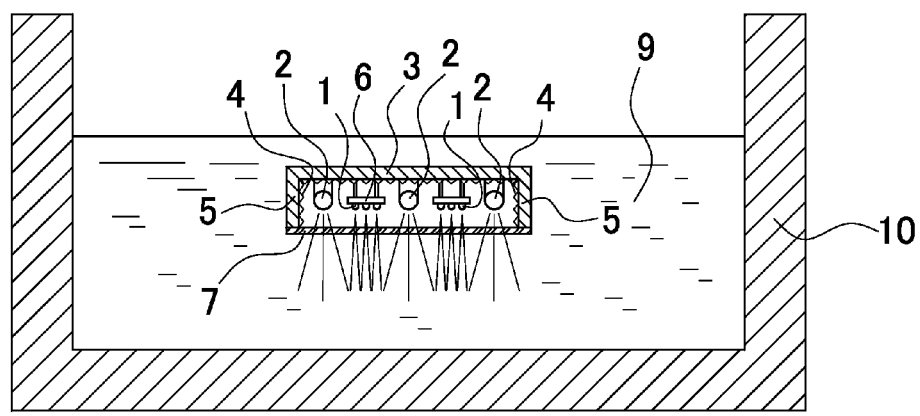
FIG. 10 is a schematic cross-section showing operation of an apparatus to kill bacteria with ultraviolet light for another embodiment of the present invention.

The apparatus to kill bacteria with ultraviolet light shown in FIGS. 7-10 shine UVA ultraviolet light to disinfect water that is outdoors and is either polluted water, outdoor swimming pool water, or fish farm (aquaculture) pond water. The apparatus to kill bacteria with ultraviolet light in FIGS. 7 and 8 are disposed above the water 9 surface to shine UVA ultraviolet light on water 9 that is outdoors and held in a tank 10. The apparatus to kill bacteria with ultraviolet light in FIGS. 9 and 10 have a water-tight structure and are immersed in the water 9 to shine UV light on that water 9. The apparatus in FIGS. 7 and 9 are provided with UV LEDs 1 that emit UVA ultraviolet light and are disposed inside a case 3. The apparatus in FIGS. 8 and 10 are provided with UVC light sources 2 disposed inside the case 3 that shine UVC ultraviolet light, in addition to the UV LEDs 1.

The inside of the case 3 is provided with a reflecting layer 4 that reflects UV light. The case 3 shown in these and other figures is provided with side-walls 5 around the perimeter to effectively reflect UV light emitted by the UV LEDs 1 and UVC light sources 2 and shine it on the water 9. In particular, the side-walls 5 of a case 3 housing UVC light sources 2 prevent UVC ultraviolet light from escaping out the sides of the case 3.

Figure 11:
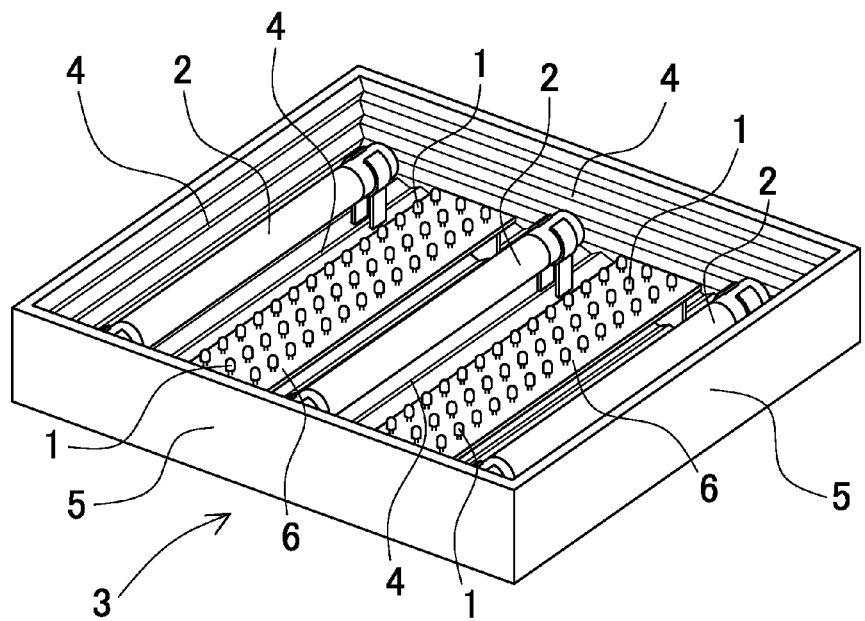
FIG. 11 is an oblique view showing the internal structure of the apparatus to kill bacteria with ultraviolet light shown in FIGS. 8 and 10.

The case 3 houses circuit boards 6, and a plurality of UV LEDs 1 are mounted on those circuit boards 6. The circuit boards 6 of the figures have long narrow board-shapes and a plurality of UV LEDs 1 is mounted in a plurality of rows on the circuit boards 6. The case in FIGS. 7 and 9 has circuit boards 6 disposed in a plurality of rows to increase the surface area illuminated by the UV LEDs 1. However, the case can also house a single circuit board with a plurality of UV LEDs mounted on that circuit board. As shown in the oblique view of FIG. 11, the case 3 in FIGS. 8 and 10 houses long narrow circuit boards 6 carrying a plurality of UV LEDs 1 alternately disposed between long narrow circular cylindrical UV lamps that are the UVC light sources 2. This configuration has the characteristic that UV light emitted from the UVC light sources 2 and the plurality of UV LEDs 1 mounted on the circuit boards 6 can shine uniformly over a wide area.

The apparatus to kill bacteria with ultraviolet light in FIGS. 9 and 10 have the open region of the case 3 closed-off by a transparent plate 7 to implement a water-tight structure. To seal the perimeter of the open region of the case 3 in a water-tight manner, the transparent plate 7 is attached to the case with waterproofing material such as gasket material (not illustrated) intervening at the interface between the transparent plate 7 and the edges of the side-walls 5. The transparent plate 7 passes UV light emitted by the internal UV LEDs 1 and UVC light sources 2 for illumination outside the case 3. Accordingly, quartz glass with superior UV transmission properties is used as the transparent plate 7. However, materials such as calcium fluoride and magnesium fluoride can also be used for the transparent plate.

The overall configuration of the case 3 described above is that of a box-shaped container. Circuit boards 6 carrying a plurality of UV LEDs 1, or UVC light sources 2 and circuit boards 6 carrying a plurality of UV LEDs 1 are disposed inside the case 3. However, in the apparatus to kill bacteria with ultraviolet light of the present invention, the form of the case and disposition of the UV LEDs and UVC light sources are not limited to the configuration described above. The plurality of UV LEDs can be mounted on the front and/or back of mounting material having any possible shape such as planar, axial, cylindrical, spherical, or solid rectangular. Further, the mounting material can be held in cases of various shapes to shine light emitted from the UV LEDs on the nearby water in a manner determined by the shape of the mounting material.

Figure 12:
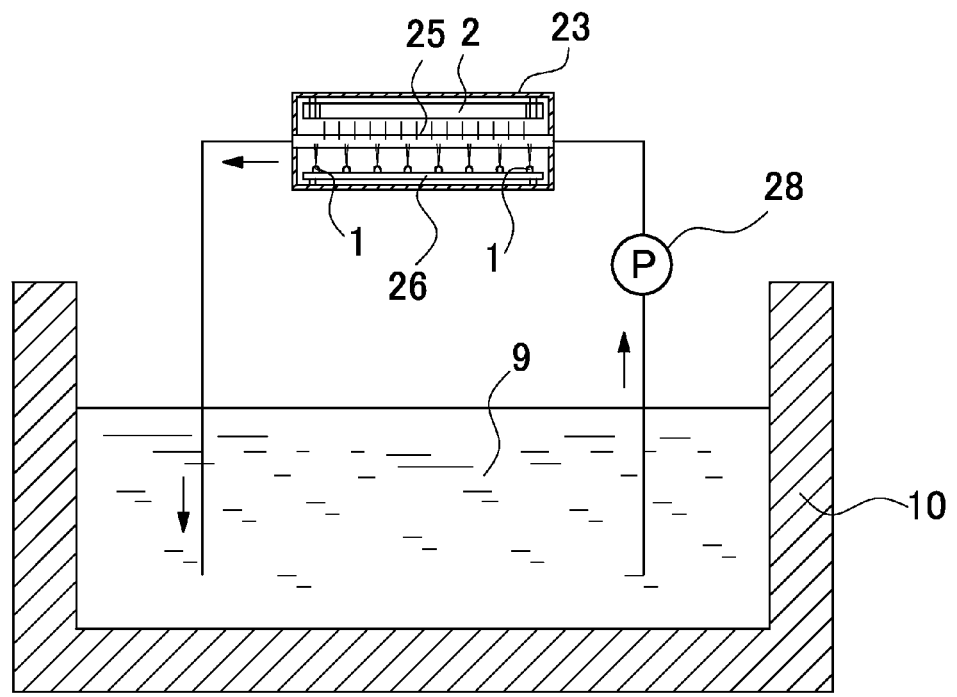
FIG. 12 is a schematic cross-section showing operation of an apparatus to kill bacteria with ultraviolet light for another embodiment of the present invention.
Figure 13:
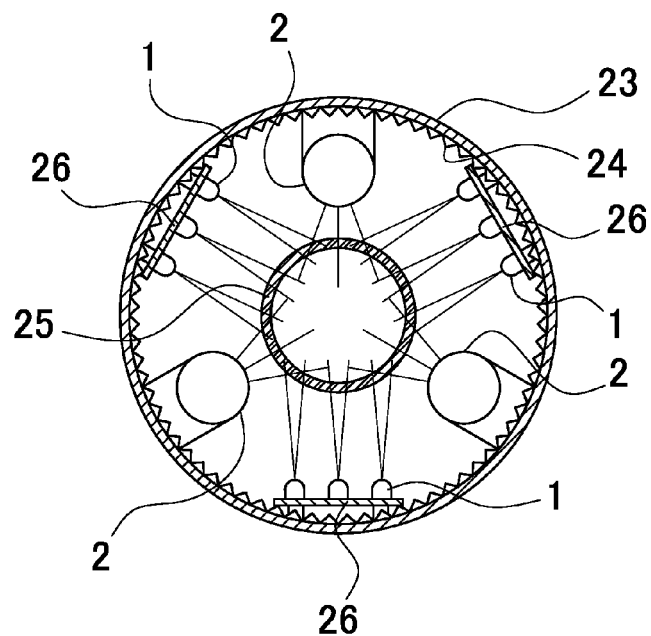
FIG. 13 is an enlarged lateral cross-section showing the internal structure of the apparatus to kill bacteria with ultraviolet light shown in FIG. 12.

The apparatus to kill bacteria with ultraviolet light in FIGS. 12 and 13 has a plurality of UV LEDs 1 housed inside a circular cylindrical case 23 and has a transparent flow pipe 25 disposed coaxially within the cylindrical case 23. This configuration shines UVA ultraviolet light emitted by the UV LEDs 1 on the flow pipe 25 to kill bacteria in water 9 flowing through the flow pipe 25. As shown in FIG. 12, this apparatus passes water 9, which is disposed outdoors, through the flow pipe 25 via a circulating device 28 such as a pump, and kills bacteria by shining UV light on the water 9 flowing through the flow pipe 25. As shown in FIG. 13, the cylindrical case 23 is provided with a reflecting layer 24 on its interior surface. The flow pipe 25 is a cylindrical quartz glass pipe that can efficiently transmit ultraviolet light emitted from the UV LEDs 1. The plurality of UV LEDs 1 is mounted on circuit boards 26, which are the mounting material, and the circuit boards 26 are mounted at equal intervals on the interior surface of the cylindrical case 23. Further, the apparatus shown in the figures has UVC light sources 2 disposed between the circuit boards 6 on the interior surface of the cylindrical case 23. This apparatus to kill bacteria with ultraviolet light can simultaneously irradiate water 9 flowing through the flow pipe 25 with UVA ultraviolet light from the UV LEDs 1 and UVC ultraviolet light from the UVC light sources 2 to effectively kill bacteria.

Figure 14:
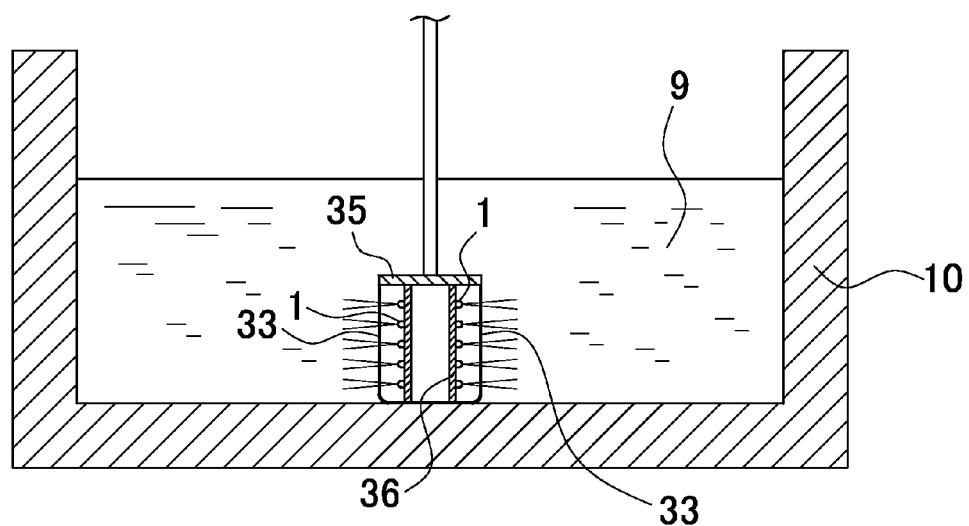
FIG. 14 is a schematic cross-section showing operation of an apparatus to kill bacteria with ultraviolet light for another embodiment of the present invention.
Figure 15:
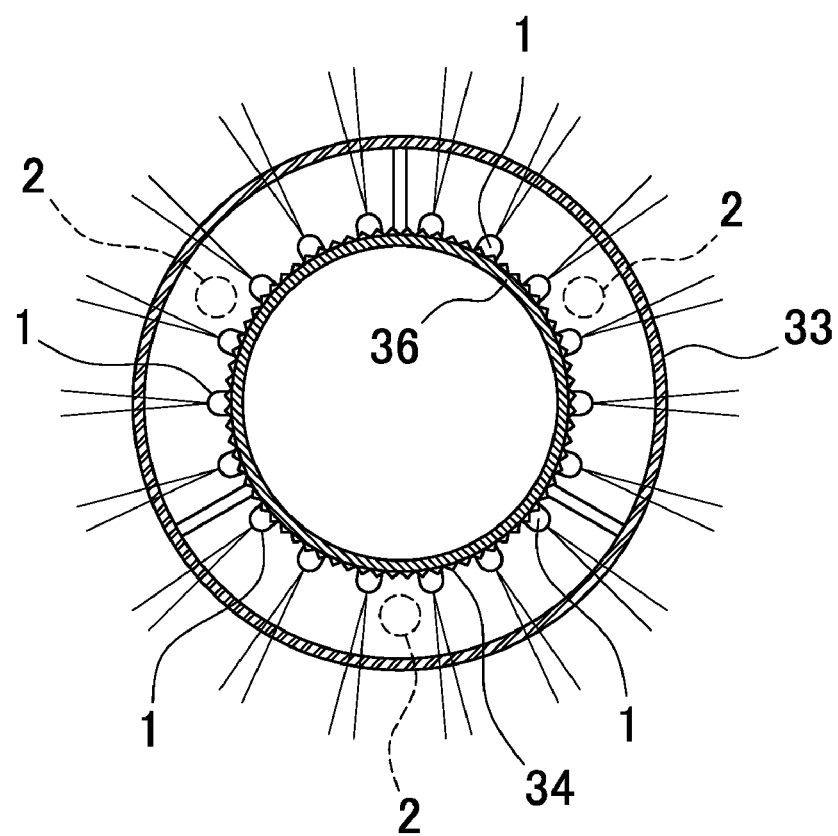
FIG. 15 is an enlarged lateral cross-section showing the internal structure of the apparatus to kill bacteria with ultraviolet light shown in FIG. 14.

Turning to the apparatus to kill bacteria with ultraviolet light shown in FIGS. 14 and 15, a water-tight, water proof structure is implemented, and a plurality of UV LEDs 1 are held inside a transparent container 33 that transmits ultraviolet light emitted by the UV LEDs 1. As shown in FIG. 14, this apparatus is immersed in water 9, which is outdoors, and kills bacteria by shining UV light on the water 9. The container 33 is shaped as a circular cylinder with a closed bottom and the open top is sealed closed in a water-tight manner by a sealing cover 35. The container 33 is made of quartz glass allowing it to efficiently transmit UV light emitted from the UV LEDs 1. The plurality of UV LEDs 1 is disposed inside the container 33 with an orientation that emits light outward. This UV LED 1 mounting structure enables the emitted UV light to diverge in all directions. The apparatus in FIG. 15 has a plurality of UV LEDs 1 mounted at equal intervals on a mounting cylinder 36, which is the mounting material, and the mounting cylinder 36 is disposed coaxially inside the circular cylindrical container 33. The mounting cylinder 36 of the figure has a reflecting layer 34 established on its perimeter surface to effectively reflect UV light and illuminate the water 9. This configuration of the apparatus to kill bacteria with ultraviolet light has the characteristic that it is compact while being effective in killing bacteria over a wide area. As shown by the broken lines in FIG. 15, the apparatus can also have UVC light sources 2 disposed outside the mounting cylinder 36, and the water 9 can be illuminated with both UVA and UVC ultraviolet light to kill bacteria even more effectively.

The UV LEDs 1 emit UVA ultraviolet light having a primary emission peak with a wavelength in the range from 320 nm to 400 nm. More preferably, the range of wavelengths can be further narrowed with a UV LED 1 primary emission peak from 350 nm to 380 nm. UV LEDs 1 with a primary emission peak within these wavelength ranges are implemented by gallium-nitride-based compound semiconductor light emitting devices. These types of UV LEDs 1 emit light in the part of the electromagnetic spectrum at the border between visible and near ultraviolet light. Visible light has a wavelength in the range from 380 nm and greater.

UV LED 1 output intensity 1 cm away from the end of the LED along the emission center-line is, for example, greater than or equal to 10 mW/cm$^2$, preferably greater than or equal to 50 mW/cm$^2$, and even more preferably greater than or equal to 60 mW/cm$^2$.

The UVC light sources 2 are UV lamps that irradiate UVC ultraviolet light in a wavelength range less than 280 nm. The UVC light sources 2 of the figures show the most generally used UV lamps, which are long slender circular cylindrical tubes. In an apparatus to kill bacteria with ultraviolet light equipped with UVC light sources 2, bacteria are killed by UVA ultraviolet light emitted by the UV LEDs 1. In addition, bacteria are killed even more effectively by a synergistic effect due to UVC ultraviolet light from the UVC light sources 2. In particular, while suppressing photoreactivation with UVA illumination from the UV LEDs 1, bacteria can be killed even more effectively by the combined action of UVC and UVA ultraviolet light. The output intensity of the UVC light sources 2 can be lower than the UV LED 1 intensity. Accordingly, UVC light source 2 output intensity is, for example, greater than or equal to 1 $\mu$W/cm$^2$, preferably greater than or equal to 5 $\mu$W/cm$^2$, and even more preferably greater than or equal to 10 $\mu$W/cm$^2$.

Instead of shining ultraviolet light from the UV LEDs and UVC light sources directly on the water, the ultraviolet light can also be reflected and shined indirectly on the water. Further, part of the UV light emitted by the UV LEDs and UVC light sources can also be shined on a photocatalyst to kill bacteria via synergistic effects with the photocatalyst. In addition, part of the UV light can also be shined on wavelength converting material such as fluorescent material to change the wavelength of the UV light. The apparatus to kill bacteria with ultraviolet light of the present invention can activate a photocatalyst with UV light emitted by the UV LEDs and UVC light sources to take advantage of activated oxygen in synergy with UV light. However, when used together with a photocatalyst, there can be variation and degradation in the photocatalyst, and material cost as well as processing cost will increase. Consequently, effective antibacterial action can be realized by shining UV light from the UV LEDs and UVC light sources as efficiently as possible on the water without using a photocatalyst or wavelength converting material.

Figure 16:
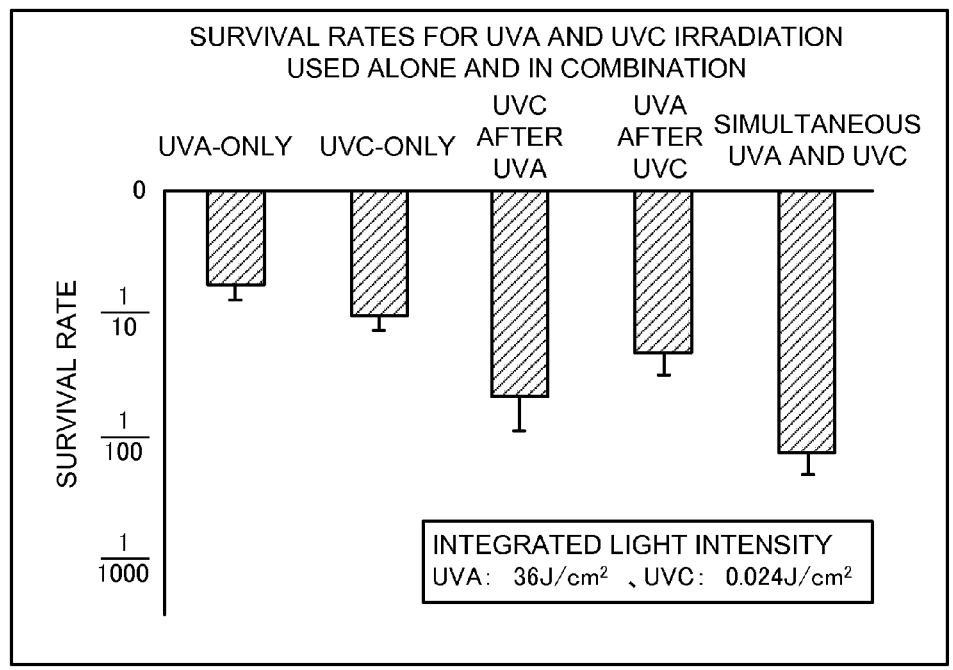
FIG. 16 is a bar graph showing bacteria survival rates for UVA and UVC irradiation used alone and in combination.

FIG. 16 is a bar graph showing bacteria survival rates for UVA and UVC irradiation used alone and in combination. However, bacteria survival rate shown in this figure is the reduction in the number of $V.$ $parahaemolyticus$ bacteria due to UVA and/or UVC exposure compared to the number of bacteria with no exposure. Here, UVA light is irradiated for 6 minutes with an integrated intensity or energy per area of 36 J/cm$^2$, and UVC light is irradiated for 6 minutes with an integrated intensity of 0.024 J/cm$^2$. This figure shows that exposure to UVA-only kills $V.$ $parahaemolyticus$ bacteria to reduce their numbers to approximately $\frac{1}{5}^{th}$ the population with no irradiation. Exposure to UVC-only kills $V.$ $parahaemolyticus$ bacteria to reduce their numbers to approximately $\frac{1}{10}^{th}$ the population with no irradiation. When UVC is irradiated after UVA exposure, bacteria count is reduced to approximately $\frac{1}{46}^{th}$ the population with no irradiation; when UVA is irradiated after UVC exposure, bacteria count is reduced to approximately $\frac{1}{21}^{st}$ the population with no irradiation; and when UVA and UVC are irradiated simultaneously, bacteria count is reduced to approximately $\frac{1}{130}^{th}$ the population with no irradiation. This graph clearly shows that disinfection increases synergistically with simultaneous UVA and UVC ultraviolet light irradiation.

Figure 17:
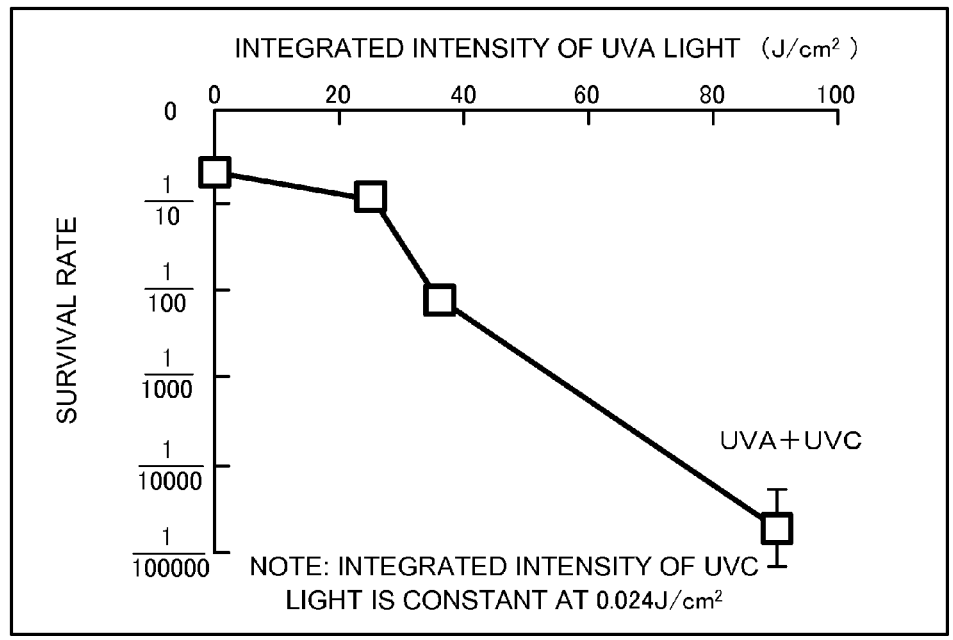
FIG. 17 is a graph showing antibacterial effectiveness as a function of the amount of UVA irradiation combined with a constant amount of UVC.

FIG. 17 is a graph showing increased effectiveness in killing $V.$ $parahaemolyticus$ bacteria as the integrated intensity or energy per area of UVA illumination is increased. This figure shows survival rate as the reduction in *V. parahaemolyticus* bacteria count as the exposure time to UVA with an illumination intensity of 100 mW/cm² is varied to change the integrated intensity (energy per area) from 0 to 100 J/cm² while irradiating UVC for 6 minutes with a constant integrated intensity of 0.024 J/cm². This graph shows the ratio of the number of *V. parahaemolyticus* bacteria when exposed to UVA and UVC ultraviolet light compared to the number of bacteria when exposed to no UVA or UVC ultraviolet light. From this graph it is clear that the antibacterial effect of simultaneous UVA and UVC illumination increases markedly as the integrated intensity (energy per area) of UVA light increases. Here, survival rate is approximately $1/10^{th}$ when UVA integrated intensity is 25 J/cm², approximately $1/100^{th}$ when UVA integrated intensity is 36 J/cm², and approximately $1/50000^{th}$ showing extremely effective disinfection when UVA integrated intensity is 90 J/cm².

Since the integrated intensity of UVC ultraviolet light in the graph of FIG. 17 is 0.024 J/cm², the UVA/UVC integrated intensity ratio is approximately 1000 when the integrated intensity of UVA ultraviolet light is 25 J/cm². The UVA/UVC integrated intensity ratio is approximately 1500 when the integrated intensity of UVA ultraviolet light is 36 J/cm², and approximately 3750 when the integrated intensity of UVA ultraviolet light is 90 J/cm². Consequently, the antibacterial effect of irradiation with both UVA and UVC ultraviolet light can be markedly improved when the integrated intensity of UVA light is 500 or more times that of the UVC light. Preferably, the integrated intensity of UVA light is made 1000 or more times that of the UVC light, and even more preferably the integrated intensity of UVA light is made 1500 or more times that of the UVC light. The integrated intensity of UVA and UVC ultraviolet light is the integral of the illumination intensity over the illumination time interval. Therefore, in an apparatus that simultaneously irradiates UVA and UVC ultraviolet light with constant intensities, the UVA/UVC integrated intensity ratio becomes the UVA/UVC illumination intensity ratio.

Figure 18:
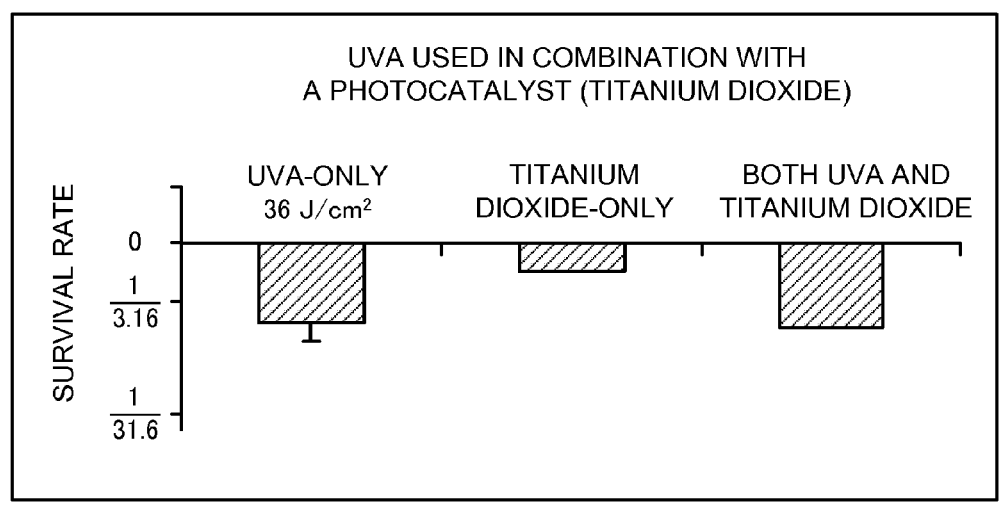
FIG. 18 is a bar graph showing bacteria survival rates for UVA irradiation used in combination with a titanium dioxide photocatalyst.

Turning to FIG. 18, the antibacterial effect of UVA irradiation used in combination with a titanium dioxide photocatalyst is shown. In this figure, the wells of a 96-well microplate (for bioscience applications) are filled with 2000 of *V. parahaemolyticus* bacteria solution having a concentration of $10^6$ bacteria/ml, and the reduction in the number of *V. parahaemolyticus* bacteria due to UVA and UVC exposure is shown as the survival rate. Here, the bottoms of wells are coated with 0.5 cm² of titanium dioxide. The bacteria survival rate is ⅕ for exposure to UVA-only, ½ for titanium dioxide-only, and ⅙ for both titanium dioxide and UVA exposure. From this figure it is clear that antibacterial synergy between titanium dioxide and UVA ultraviolet light is extremely weak.

[First Embodiment]
[Construction of the Apparatus to Kill Bacteria with Ultraviolet Light]

As shown in FIG. 7, a plurality of UV LEDs 1 is disposed in a prescribed arrangement inside the case 3. The UV LEDs 1 are mounted in the case 3 via circuit boards 6 in an orientation that emits light directly downward. The UV LEDs 1 are (Nichia Corporation) devices with a primary emission peak of 365 nm, an emission spectrum with a 10 nm width at half-maximum, and an output intensity of 100 mW. The UV LEDs 1 are connected in series and parallel and connected to a power supply (Kikusui Electronics Corporation PAS 40-9). The power supply is a direct current (DC) power supply with output stabilization. The power supply is used in the constant current mode supplying a specified UV LED 1 current of 500 mA to attain an output intensity of 100 mW.

The exceptional antibacterial effects of the apparatus to kill bacteria with ultraviolet light described above are confirmed by the tests detailed below.

[Culture Medium Preparation]

Lysogeny broth (LB) was used as the medium for bacteria culture. The following describes the preparation method for liquid and gelatin (agar) media (LB plates) for bacteria culture.

| LB medium composition | tryptone | 1% | 10 g/l |
|---|---|---|---|
| | yeast extract | 0.5% | 5 g/l |
| | NaCl | 1% | 10 g/l |

For LB agar medium, agar is added to 1.5% (weight/volume).

LB medium is prepared by dissolving the constituents in deionized water, and subsequently sterilizing in an autoclave (121° C. for 20 min). For LB agar medium, a magnetic stirring bar is used to stir the solution to uniformity after autoclave sterilization. When the solution has cooled to approximately 65° C., an appropriate quantity is dispensed into a 10 cm disposable plastic Petri dish (Eiken Chemical Co. LTD.) and placed on a horizontal surface to solidify.

[Indicator Bacteria for the Experiments]

The non-virulent DH5α strain of *E. coli* bacteria is used as the indicator bacteria for evaluating antibacterial effects in water that is outdoors. To study the antibacterial effects of experimentally built apparatus to kill bacteria with ultraviolet light, *E. coli* bacteria were incubated using 5 ml of LB medium in a shaking incubator (environmental shaker) for 16 hrs at 37° C.

[Method of Adjusting the Number of Bacteria]

The number of bacteria in the experiments are quantified by surface plate techniques. Here, a given quantity of bacteria solution is spread onto an agar medium plate and incubated. The number of resulting bacteria colonies is counted. A colony is a cluster of bacteria of the same species. Although an individual bacterium cannot be seen with the naked eye, a colony can be confirmed visually. To adjust the number of bacteria, first an approximate measurement is taken with a spectrophotometer, and then serial dilution is performed.

[Spectrophotometer]

Light of a given wavelength passing through a solution layer of a given substance changes in intensity from the intensity of the incident light $I_o$ to the intensity of the transmitted light I. The ratio of the transmitted light to the incident light $(I/I_o)$ is called the transmittance (t), and that transmittance can be expressed as a percent transmittance (T) by multiplying by 100%. The optical density (OD), which is also called absorbance (A), is the log to the base 10 of the reciprocal of the transmittance (t).

$$T=(I/I_o)\times 100\%$$

$$A=-\log_{10}(t)=\log_{10}(I_o/I)=OD$$

To quantify the number of *E. coli* bacteria, spectrophotometer measurements are made using a light wavelength of 600 nm and the resulting optical density is abbreviated $OD_{600}$. In the experiments, spectrophotometer $OD_{600}$ measurements are made for phosphate buffered saline (PBS) solution used as the bacteria solution. Bacteria are mixed with the diluting solution (PBS) to adjust the $OD_{600}$ measurement to a value of 1.0. Bacteria solution with an $OD_{600}$ value of 1.0 is used as the stock solution, and serial dilution with PBS is performed up to $10^6$-fold dilution. Here, 100 μl of stock solution is mixed with 900 µl of PBS for a 10-fold dilution. Subsequently, 100 µl of the 10-fold diluted solution is mixed with 900 µl of PBS for a 100-fold dilution, and this process is repeated for a series of six dilutions.

[Pre-UV Exposure Bacteria Count]

Preliminary experimentation showed that bacteria solution diluted $10^5$-fold and $10^6$-fold are suitable for counting bacteria prior to UV exposure. Accordingly, 100 µl of each solution is dispensed on an LB plate, spread over the entire surface with a bacteria spreader, and incubated for 16 hrs at 37° C. Subsequently, the number of bacteria colonies generated on the LB agar medium is counted. Colony counting is performed by counting all the colonies visible to the naked eye from the reverse side of the Petri dish. The number of bacteria is found by multiplying the colony count for the LB plate of each dilution level by the dilution factor for that level, and then averaging the results. The number of bacteria in the bacteria solution is adjusted, for example, to $5 \times 10^9$ bacteria/ml.

[UV Irradiation with the Apparatus to Kill Bacteria with Ultraviolet Light]

(1) Disinfection Step

200 µl of bacteria solution adjusted in the manner described above is dispensed into sterile well microplate (Becton Dickinson Labware).

Approximately $10^9$ bacteria exist in this 200 µl of bacteria solution. UVA ultraviolet light emitted by UV LEDs 1 having a primary emission peak of 365 nm and an intensity of 70 mW/cm$^2$ is shined on the bacteria solution for 30 min. UVA ultraviolet light exposure in this step is for the purpose of killing *E. coli* bacteria, which are the indicator bacteria. The number of bacteria is measured after UV light exposure.

(2) Photoreactivation Step

Subsequently, UVA light with a primary emission peak at 365 nm, which is a component of sunlight, is separately irradiated in three intensity levels at 0.01 mW/cm$^2$, 0.09 mW/cm$^2$, and 0.30 mW/cm$^2$. UVA ultraviolet light exposure in this step is for the purpose of measuring the change in bacteria count due to photoreactivation after disinfection. The bacteria count for each UV light intensity level is measured after 30 min, 60 min, 120 min, and 180 min of exposure.

[Post-UV Exposure Bacteria Count]

The post-UV exposure bacteria count is measured by removing the bacteria solution and diluting it in PBS by 10-fold and 100-fold. 100 µl each of the undiluted (stock), 10-fold diluted, and 100-fold diluted solutions is dispensed on an LB plate, spread over the entire surface with a bacteria spreader, and incubated for 16 hrs at 37° C. Subsequently, the number of bacteria colonies generated on the LB agar medium is counted, and the remaining bacteria count for each UV exposure condition is calculated. To evaluate the antibacterial effects of ultraviolet light exposure by UV LED 1 illumination, the pre-UV exposure (pre-disinfection) bacteria count is normalized to one, and the post-UV exposure *E. coli* bacteria count is expressed as a fraction relative to one.

Figure 1:
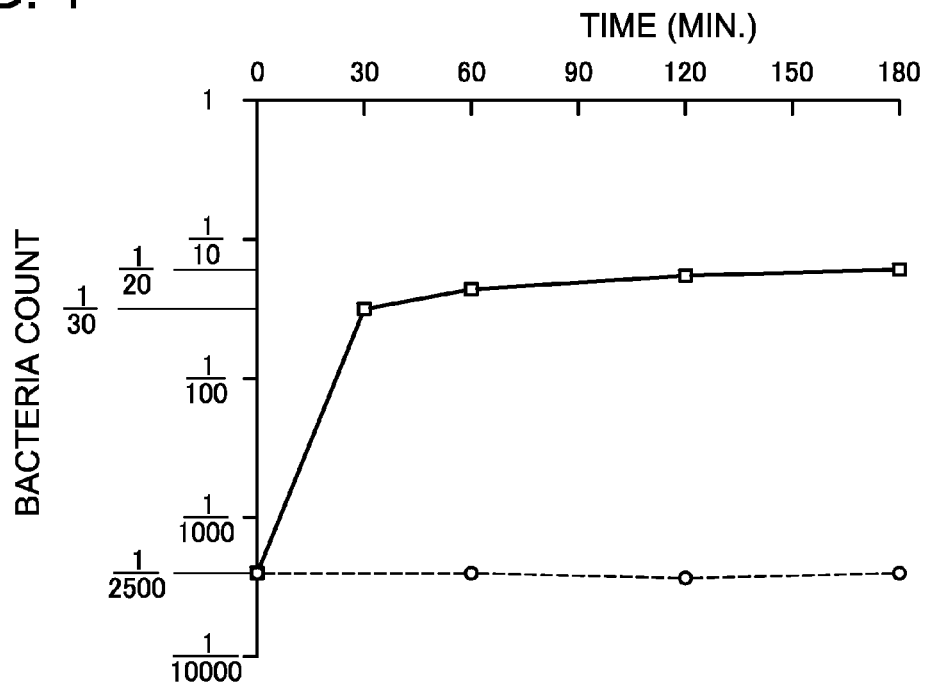
FIG. 1 is a graph showing bacteria recovery due to photoreactivation after disinfection by ultraviolet light irradiation.
Figure 2:
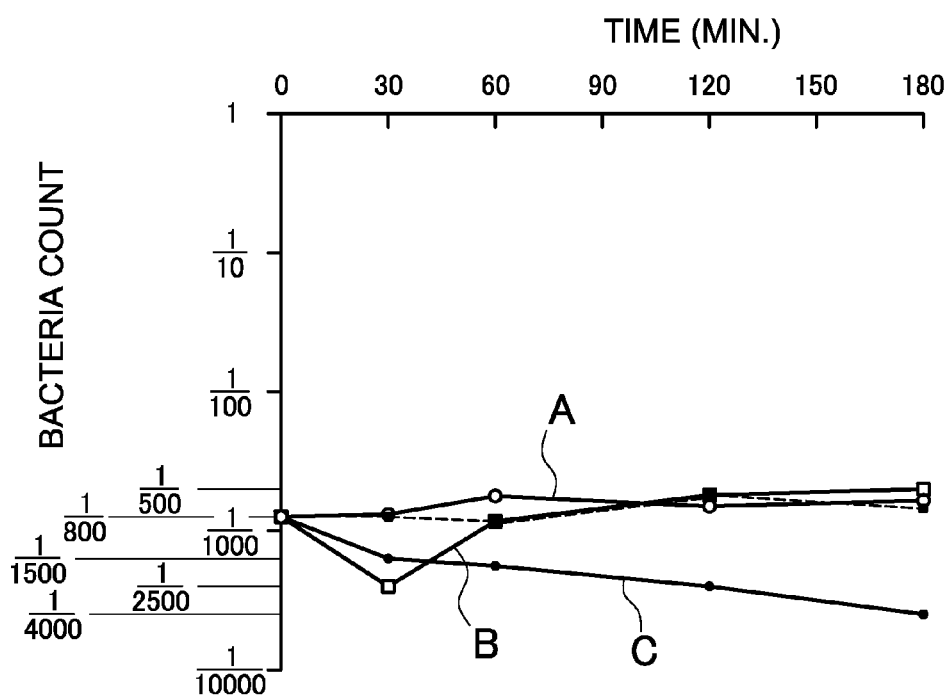
FIG. 2 is a graph showing suppression of photoreactivation with an apparatus to kill bacteria with ultraviolet light; and the graph shows the antibacterial effects on E. coli bacteria in experiment example 1.

Experimental results for the procedures described above are shown in FIG. 2. This figure shows that the number of *E. coli* bacteria is reduced to approximately $\frac{1}{800}^{th}$ by 30 min exposure to UVA ultraviolet light with a primary emission peak of 365 nm and intensity of 70 mW/cm$^2$ in the disinfection step. Subsequently, the change in bacteria count is shown for exposure to UVA light included in sunlight in the photoreactivation step. The curves A, B, and C in this figure show the change in bacteria count due to exposure to light having a UV intensity of 0.01 mW/cm$^2$, 0.09 mW/cm$^2$, and 0.30 mW/cm$^2$ respectively after initial disinfection. The broken line in this graph shows the bacteria count after initial disinfection with no subsequent exposure to UVA included in sunlight. From this graph it is clear that after reduction of the *E. coli* bacteria population to $\frac{1}{800}^{th}$ by irradiation with UVA ultraviolet light in the disinfection step, *E. coli* bacteria do not multiply due to photoreactivation even when exposed to UVA included in sunlight with various UV intensities. In fact, as shown by curve C, further exposure to UVA ultraviolet light can reduce the number of bacteria.

[Second Embodiment]

Besides using *V. parahaemolyticus* bacteria instead of non-virulent *E. coli* bacteria as the indicator bacteria for outdoor water treatment and using UVA included in sunlight with a UV intensity of 0.30 mW/cm$^2$ in the photoreactivation step after disinfection, the change in bacteria count for the second embodiment is determined in the same manner as in the first embodiment.

Figure 3:
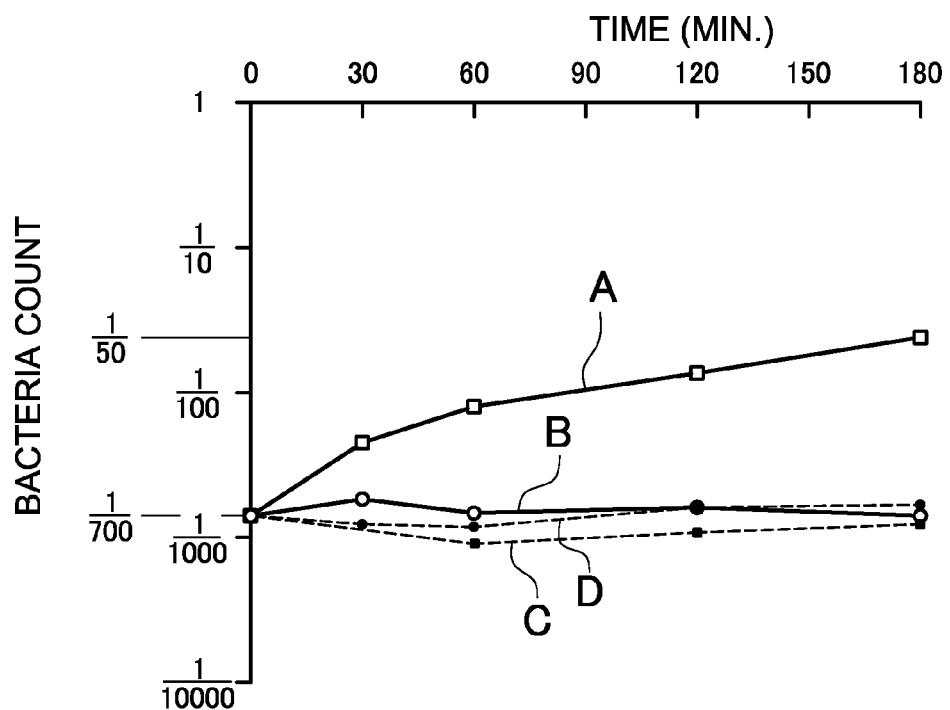
FIG. 3 is a graph showing suppression of photoreactivation with an apparatus to kill bacteria with ultraviolet light; and the graph shows the antibacterial effects on V. parahaemolyticus bacteria in experiment example 2 and comparison example 1.

Experimental results for the second embodiment are shown in FIG. 3 (curves B and D). In this figure, the *V. parahaemolyticus* bacteria count is reduced to $\frac{1}{700}^{th}$ in the disinfection step that shines UVA ultraviolet light with a primary emission peak of 365 nm and intensity of 70 mW/cm$^2$. Subsequently in the photoreactivation step, the change in *V. parahaemolyticus* bacteria count is shown for exposure to UVA included in sunlight having a primary emission peak of 365 nm. Curve B of the graph shows the change in bacteria count for exposure to UV light with an intensity of 0.30 mW/cm$^2$ in the photoreactivation step. Broken line curve D of the graph shows the change in bacteria count for no exposure to UVA included in sunlight. From this graph it is clear that after *V. parahaemolyticus* bacteria disinfection to $\frac{1}{700}^{th}$ by UVA irradiation in the disinfection step, there is no proliferation of *V. parahaemolyticus* bacteria as a result of photoreactivation even when exposed to UVA included in sunlight.

[Third Embodiment]

The third embodiment uses the apparatus to kill bacteria with ultraviolet light shown in FIG. 8 to treat (bacterially) polluted water that is outdoors. The apparatus shown in FIG. 8 is provided with a plurality of UV LEDs 1 and UVC light sources 2 inside the case 3. In the disinfection step, UVA ultraviolet light with a primary emission peak of 365 nm and intensity of 70 mW/cm$^2$ is irradiated via the UV LEDs 1 for 15 min. In the photoreactivation step after disinfection, the bacteria count is determined after 180 min exposure to UVA included in sunlight with an intensity of 0.30 mW/cm$^2$.

Figure 5:
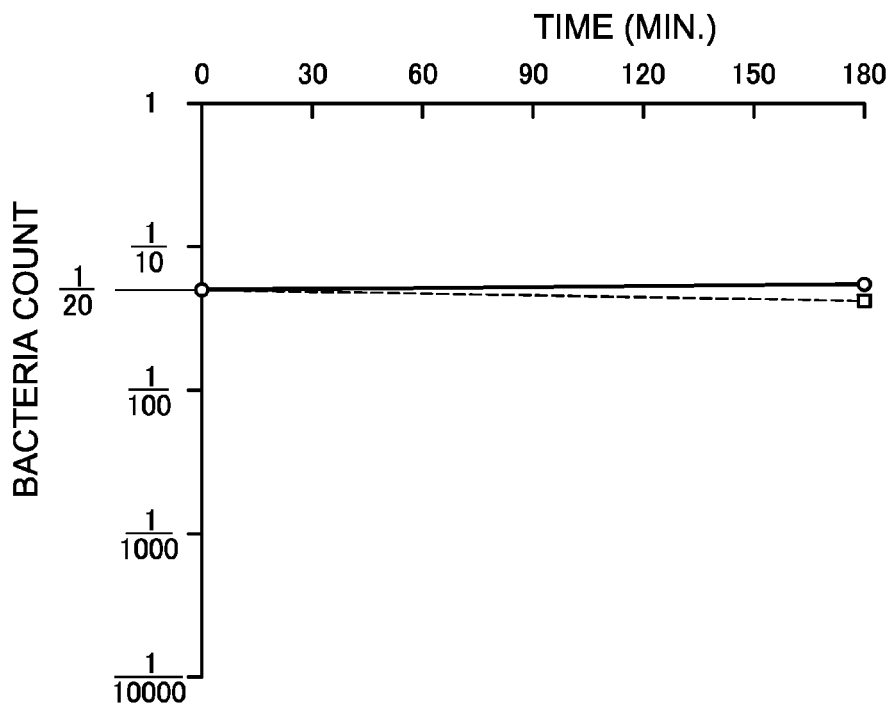
FIG. 5 is a graph showing suppression of photoreactivation with an apparatus to kill bacteria with ultraviolet light; and the graph shows antibacterial effects in polluted water for experiment example 3.

Experimental results for the third embodiment are shown in FIG. 5. This figure shows the change in bacteria count in the photoreactivation step after reducing the bacteria population in polluted water to approximately $\frac{1}{20}^{th}$ in the disinfection step. The solid line of the graph shows the change in bacteria count with exposure to UVA included in sunlight in the photoreactivation step. The broken line of the graph shows the change in bacteria count for no exposure to UVA included in sunlight. From this graph it is clear that after reducing the bacteria count in polluted water to $\frac{1}{20}^{th}$ by UVA irradiation in the disinfection step, there is no bacteria population increase as a result of photoreactivation even when exposed to UVA included in sunlight.

[Fourth Embodiment]

Besides exposure in the disinfection step to UVC ultraviolet light from the UVC light sources 2 having a primary emission peak of 254 nm and intensity of 0.02 mW/cm$^2$ in addition to exposure to UVA ultraviolet light from the UV LEDs 1 having a primary emission peak of 365 nm and intensity of 70 mW/cm$^2$, the change in bacteria count for the fourth embodiment is determined in the same manner as in the third embodiment. Specifically, polluted water in the disinfection step of the fourth embodiment is exposed to simultaneous UVC and UVA ultraviolet light illumination for 15 min.

Figure 6:
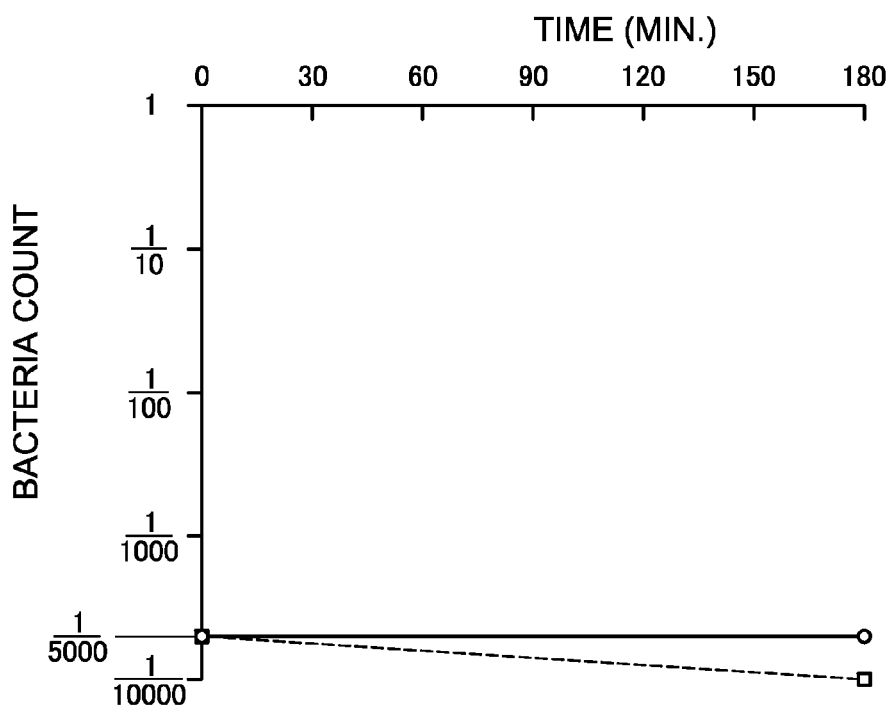
FIG. 6 is a graph showing suppression of photoreactivation with an apparatus to kill bacteria with ultraviolet light of the present invention; and the graph shows antibacterial effects in polluted water for an embodiment of present invention.

Experimental results for the fourth embodiment are shown in FIG. 6. This figure shows the change in bacteria count in the photoreactivation step after reducing the bacteria population in polluted water to approximately $1/5000^{th}$ in the disinfection step. The solid line of the graph shows the change in bacteria count in the photoreactivation step due to exposure to UVA included in sunlight having a UV intensity of 0.30 mW/cm². The broken line of the graph shows the change in bacteria count for no exposure to UVA included in sunlight. From this graph it is clear that bacteria can be killed extremely effectively to a bacteria count of approximately $15000^{th}$ by illumination with both UVC and UVA ultraviolet light in the disinfection step. Further, there is essentially no increase in bacteria count as a result of photoreactivation even after effective disinfection with UVC and UVA ultraviolet light. In particular, although UVC light source output is lower than UV LED output, extremely effective disinfection is obtained by the synergistic effect of combined UVC and UVA light exposure. Furthermore, this effective state of bacteria reduction can be maintained by suppressing increase in the treated bacteria population due to photoreactivation.

COMPARISON EXAMPLE 1

Besides exposure to UVC ultraviolet light with a primary emission peak of 254 nm and intensity of 70 mW/cm² in the disinfection step, the change in bacteria count for comparison example 1 is determined in the same manner as in the second embodiment.

Curve A of FIG. 3 shows the change in bacteria count for exposure to UVA included in sunlight with a UV intensity of 0.30 mW/cm² in the photoreactivation step after UVC disinfection. Broken line curve C of the graph shows the change in bacteria count with no exposure to UVA included in sunlight. From this graph it is clear that even when the *V. parahaemolyticus* bacteria population is reduced to $1/700^{th}$ by UVC irradiation in the disinfection step, *V. parahaemolyticus* bacteria count subsequently increases to $1/50^{th}$ after 180 min due to photoreactivation when exposed to UVA included in sunlight. Specifically, the bacteria count increases by more than a factor of ten due to photoreactivation.

COMPARISON EXAMPLE 2

Besides exposure to UVC ultraviolet light with a primary emission peak of 254 nm and intensity of 70 mW/cm² in the disinfection step, the change in bacteria count for comparison example 2 is determined in the same manner as in the third embodiment.

Figure 4:
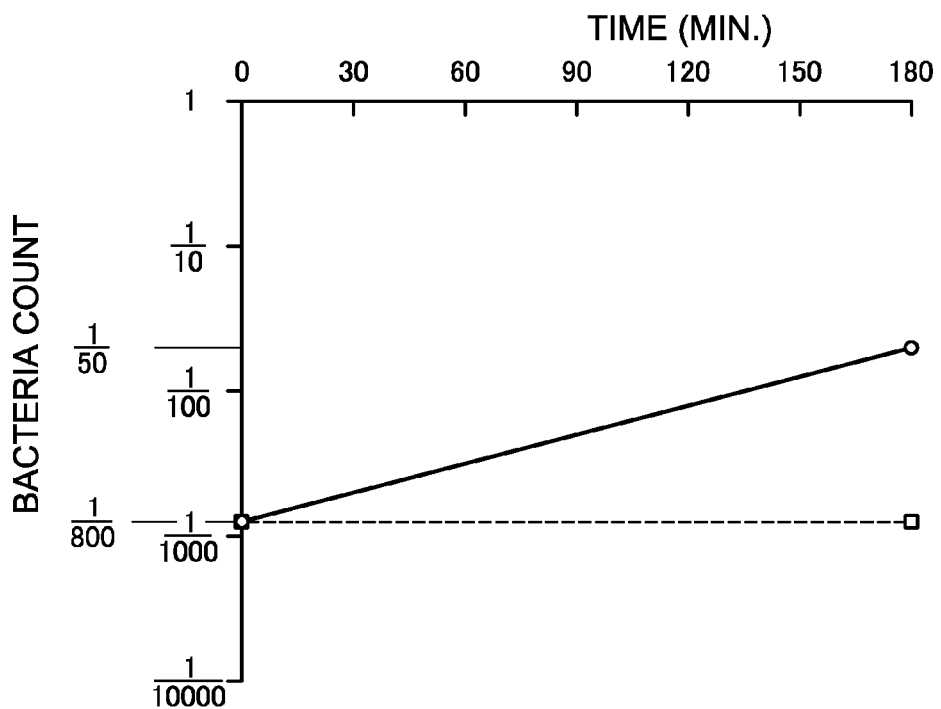
FIG. 4 is a graph showing polluted water disinfection and photoreactivation for comparison example 2.

The solid line in FIG. 4 shows the change in bacteria count for exposure to UVA included in sunlight with a UV intensity of 0.30 mW/cm² in the photoreactivation step after UVC disinfection. The broken line in this graph shows the change in bacteria count with no exposure to UVA included in sunlight. From this graph it is clear that even when the number of bacteria in polluted water is reduced to $1/800^{th}$ by UVC irradiation in the disinfection step, bacteria count subsequently increases to $1/50^{th}$ after 180 min due to photoreactivation when exposed to UVA included in sunlight. Specifically, the bacteria count for this example also increases by more than a factor of ten due to photoreactivation.

INDUSTRIAL APPLICABILITY

The present invention can be used to kill bacteria with ultraviolet light in various outdoor water treatment applications such as in (bacterially) polluted water, swimming pool water, and fish farm (aquaculture) water.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-298593 filed in Japan on Nov. 21, 2008, the content of which is incorporated herein by reference.

The invention claimed is:

1. An outdoor water treatment apparatus to kill bacteria with ultraviolet (UV) light comprising:
   UV light emitting diodes (LEDs) that emit UVA light with a primary emission peak of 320 nm-400 nm; and
   UVC light sources that irradiate UVC ultraviolet light;
   wherein UVC light source output is lower than UV LED output; and
   bacteria in the water, which is outdoors, are killed by combined exposure to both UVA ultraviolet light emitted by the UV LEDs and UVC ultraviolet light to suppress bacteria proliferation in the disinfected water due to photoreactivation.

2. The outdoor water treatment apparatus to kill bacteria with ultraviolet light as cited in claim 1 wherein the water is either (bacterially) polluted water, outdoor swimming pool water, or fish farm (aquaculture) pond water.

3. The outdoor water treatment apparatus to kill bacteria with ultraviolet light as cited in claim 1 wherein the primary emission peak of the UV LEDs is 350 nm-380 nm.

4. The outdoor water treatment apparatus to kill bacteria with ultraviolet light as cited in claim 1 wherein UV LED output intensity 1 cm away from the end of the LED along the emission center-line is greater than or equal to 10 mW/cm².

5. The outdoor water treatment apparatus to kill bacteria with ultraviolet light as cited in claim 1 wherein UVC light source output intensity 1 cm away from the light source is greater than or equal to 1 μW/cm².

6. The outdoor water treatment apparatus to kill bacteria with ultraviolet light as cited in claim 1 wherein UVA light intensity is greater than or equal to 500 times the UVC light intensity.

7. The outdoor water treatment apparatus to kill bacteria with ultraviolet light as cited in claim 1 wherein UVA light intensity is greater than or equal to 1000 times the UVC light intensity.

8. The outdoor water treatment apparatus to kill bacteria with ultraviolet light as cited in claim 1 wherein UVA light intensity is greater than or equal to 1500 times the UVC light intensity.

9. The outdoor water treatment apparatus to kill bacteria with ultraviolet light as cited in claim 1 having a case that houses UV LEDs that emit UVA ultraviolet light.

10. The outdoor water treatment apparatus to kill bacteria with ultraviolet light as cited in claim 1 having a case that houses UV LEDs and UVC light sources.

11. The outdoor water treatment apparatus to kill bacteria with ultraviolet light as cited in claim 10 wherein the inside surfaces of the case have a reflecting layer that reflects UV light.

12. The outdoor water treatment apparatus to kill bacteria with ultraviolet light as cited in claim 10 wherein the case has side-walls around its perimeter and reflects UV light emitted by the UV LEDs and UVC light sources to shine it on the water.

13. The outdoor water treatment apparatus to kill bacteria with ultraviolet light as cited in claim 10 wherein the case has a waterproof structure and is immersed in the water.

14. The outdoor water treatment apparatus to kill bacteria with ultraviolet light as cited in claim 10 wherein the case houses circuit boards carrying a plurality of UV LEDs, and the circuit boards are alternately disposed between long narrow circular cylindrical UV lamps that are the UVC light sources.

15. The outdoor water treatment apparatus to kill bacteria with ultraviolet light as cited in claim 10 provided with a transparent flow pipe disposed coaxially within a circular cylindrical case; a plurality of UV LEDs and UVC light sources are disposed inside the cylindrical case around the outside of the transparent flow pipe; and water is passed through the transparent flow pipe to kill bacteria.

16. The outdoor water treatment apparatus to kill bacteria with ultraviolet light as cited in claim 15 wherein a circulating device is provided to move water through the transparent flow pipe, and UV light is shined on the water flowing through the transparent flow pipe to kill bacteria.

17. The outdoor water treatment apparatus to kill bacteria with ultraviolet light as cited in claim 15 wherein the circular cylindrical case has a reflecting layer on its inside surface.

18. The outdoor water treatment apparatus to kill bacteria with ultraviolet light as cited in claim 1 having a water-tight, water proof structure provided with a transparent container that transmits ultraviolet light emitted by the UV LEDs wherein a plurality of UV LEDs and UVC light sources are housed inside the transparent container, which is immersed in the water and shines UV light on the water to kill bacteria.

19. The outdoor water treatment apparatus to kill bacteria with ultraviolet light as cited in claim 18 wherein the transparent container is quartz glass.

20. The outdoor water treatment apparatus to kill bacteria with ultraviolet light as cited in claim 19 having a mounting cylinder carrying UV LEDs and UVC light sources disposed inside the transparent container, and the UV LEDs and UVC light sources are mounted on the outside of the mounting cylinder.

21. The outdoor water treatment apparatus to kill bacteria with ultraviolet light as cited in claim 20 wherein the outside perimeter surface of the mounting cylinder is provided with a reflecting layer.

\* \* \* \* \*